Aug. 21, 1956

G. HILL 2,759,800

LIQUID-LIQUID CONTACTING DEVICE

Filed Dec. 28, 1953

INVENTOR.
G. HILL

BY *Hudson & Young*

ATTORNEYS

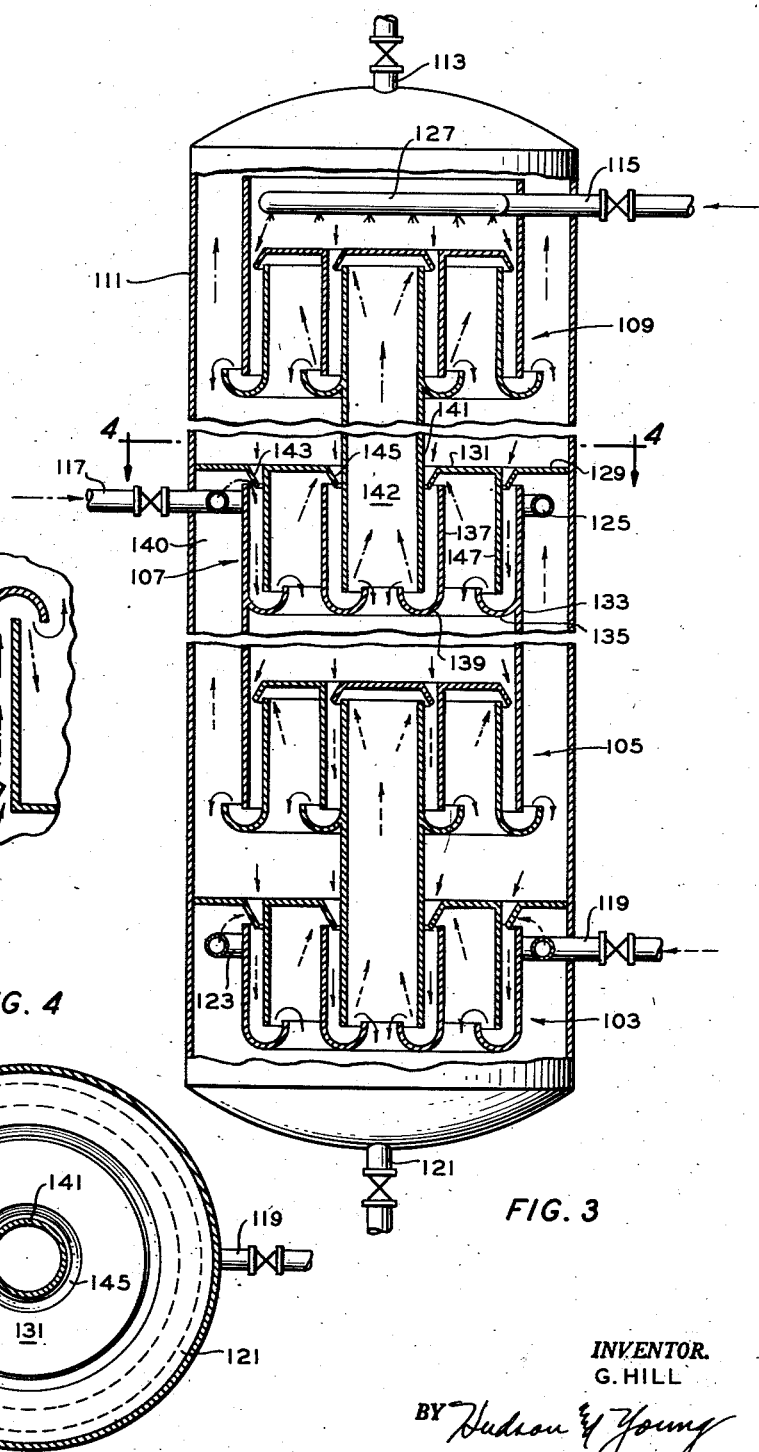

United States Patent Office 2,759,800
Patented Aug. 21, 1956

2,759,800
LIQUID-LIQUID CONTACTING DEVICE

Gooch Hill, Bartlesville, Okla., assignor to Phillips Petroleum Company, a corporation of Delaware Application December 28, 1953, Serial No. 400,399

8 Claims. (Cl. 23—270.5)

This invention relates to countercurrent treatment of liquids. In one aspect it relates to apparatus and a method of operation for effecting countercurrent liquid-liquid contacting.

An object of my invention is to provide an apparatus for use in efficiently contacting immiscible liquids.

Still another object of my invention is to provide a method for contacting and separating contacted immiscible liquids.

Yet another object of my invention is to provide a simple and inexpensive apparatus for efficiently contacting immiscible liquids.

Still other objects and advantages of my invention will be realized upon reading the following description which taken with the attached drawing respectively describes and illustrates a preferred embodiment of my invention.

The apparatus of my invention involves tray assemblies for installation in a vertically disposed treating vessel. One or more slots are provided in each tray. Extending either upward or downward from one edge of each slot is a baffle and attached to the other edge of the slots is a second baffle. This second baffle serves to form a venturi with the first baffle. The second baffle is in general considerably shorter, vertically, than the first mentioned baffle. The third baffle is disposed on the same side of the tray as the other two baffles and parallel to the first baffle and along said other edge of the above mentioned slot but at a spaced distance therefrom thereby forming a second slot intermediate said third baffle and said other edge of the slot in the tray. A semicircular baffle is fixed to the edge of the third baffle farthest from the tray and this third baffle extends around but at a spaced distance from the end of the first baffle. This arrangement of apparatus parts causes an inspirating action to occur when one liquid is passed through the first mentioned slot, between the first two baffles to draw a second liquid through the second slot into admixture with the first liquid. When the admixture of liquids reaches the end of the baffles farthest from the tray its direction of flow is reversed about 180° by the semicircular curved baffle and the admixture of immiscible liquids tends to separate by centrifugal action into two liquid phases. On issuing from this curved baffle the admixture flows into a settling zone in which the separation of the two phases is completed. One, or more than one of these contacting and separating units can be provided in conjunction with one or more contacting tray assemblies in a liquid-liquid contacting vessel. These slot-inspirating-mixing units can be straight, that is, extend across the vessel in a straight line from wall to wall. When several of such straight slot contacting elements are used they can be arranged parallel to one another across the vessel. If desired, however, the slot contacting units can be circular in form, and when several are used they are arranged concentrically with respect to the axis of the vessel.

In solvent extraction operations such as those used in the refining of lubricating oils, when the solvent is specifically heavier than the oil, the baffle arrangements are positioned on the underside of the trays and the continuous phase in the column is usually the solvent with the interface between the heavy solvent phase and the light hydrocarbon phase being maintained at a level some distance above the top tray of the column. If the solvent is specifically lighter than the liquid being treated the baffle contacting elements are disposed on the upper side of the trays so that the specifically light solvent will flow through the straight or circular slots in the trays and will draw or inspirate the heavier liquid being treated and the mixture will flow upward and around the periphery of a curved baffle into a small separating zone. During separation of the phases the heavy liquid being treated settles to the upper surface of the tray only to be inspirated into the next successive mixing unit while the specifically light liquid flows on up the column to the next tray.

In the drawing Figure 1 represents an elevational view, partly in section, of a liquid-liquid contacting column employing one embodiment of contacting tray of my invention.

Figure 3 is an elevational view, partly in section, of another embodiment of contacting apparatus of my invention.

Figure 4 is a cross-sectional view taken along the line 4—4 of Figure 3.

Figure 5 is a sectional elevational view of a portion of a liquid-liquid contacting tray illustrating another embodiment of my invention.

Figure 1:
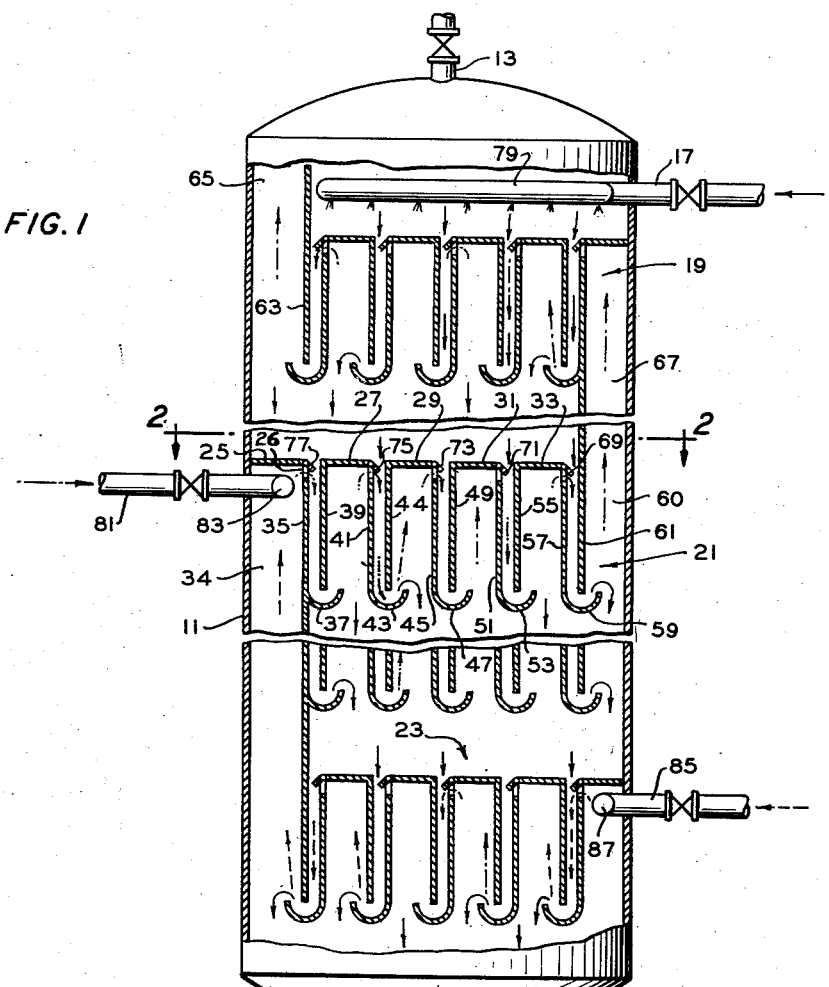

Referring now to the drawing and specifically to Figure 1 reference numeral 11 identifies a cylindrical, vertically disposed contacting vessel in which are disposed contacting tray assemblies 19, 21 and 23. For explanatory purposes I will explain in detail the construction of the contacting tray assembly 21. This tray assembly is illustrated in elevational section in Figure 1 and in plan of Figure 2. The tray portion is composed of plate elements 25, 27, 29, 31 and 33. These several plate elements constitute substantially all of the tray excepting slot-like openings between these several trays. Attached to the underside of one edge of plate 27 is a vertically disposed plane baffle plate 39. Attached to the underside of the corresponding edge of plates 29, 31 and 33 are disposed similar baffles 44, 49, and 55, respectively. Attached to the edges of the plates forming the opposite sides of the slots are sloping baffles 77, 75, 73, 71 and 69, as shown. A vertical plane baffle 35 is disposed parallel to baffle 39 and directly under the edge of plate 25 in such a manner that an elongated slot or opening 26 is formed between plate 25 and top edge of baffle 35. This baffle member 35 is relatively long and extends some little distance down the vessel and provides a passageway or riser 34 for the flow of the specifically light liquid undergoing treatment. Along baffle 35 is attached a semicircular trough or baffle element 37. The axis of this semicircular baffle 37 and the lower edge of baffle 39 substantially coincide in such a manner that liquid flowing downward between baffles 35 and 39 flows around the curved baffle 37 in a more or less stream-line manner. This flow exerts a centrifugal force to the flowing liquid in such a manner that at least partial separation of the two liquid phases occurs. When the partially separated mixture of liquids exits from the open end of the circular baffle member 37 into a settling space between baffles 39 and 41 separation of the phases is completed. The heavier liquid of the two flows downward in the direction of a next lower contacting tray while the lighter liquid rises upward to the undersurface of plate 27 only to be drawn into the next successive mixing unit between baffles 41 and 44 by the inspirating action of the specifically heavier liquid flowing downward through the constricted section between baffles 75 and 44. Admixing and contacting occurs in this mixing unit and at least partial separation occurs when the mixture flows around the curved baffle 43 and separation is completed in the settling space between baffles 44 and 45. The specifically light liquid rises upward only to be taken by inspiration into the next contacting unit and so on through the remaining contacting units on tray. When the admixture of liquids issues from the last circular baffle 59 of this tray assembly the specifically light liquid rises upward in a riser 60 and continues to rise therein to the next higher tray assembly. The liquid rising through riser 60 can be subsequently contacted with generally downflowing liquid in one or more trays higher in the column than tray 21 and the light liquid finally rises upward through a riser 67 to the upper most tray 19. This light liquid goes through several contacting stages similar to those described herein above relative to tray assembly 21. An admixture of liquids finally issues from the last mixing stage into a riser 65 which is the space between a baffle member 63 and the walls of the vessel 11. The specifically light liquid flows on upward in riser 65 to the upper most part of the vessel and this liquid is then removed through an outlet connection 13. A pipe 17, extending into the vessel, is fitted with a feed ring 79 for distribution of the specifically heavy liquid above the top tray. The specifically heavy liquid so introduced into the column starts on its downward journey through the several slots in the upper tray and admixes with the inspirated specifically light liquid from the space under each of the several elongated plate members.

Figure 2:
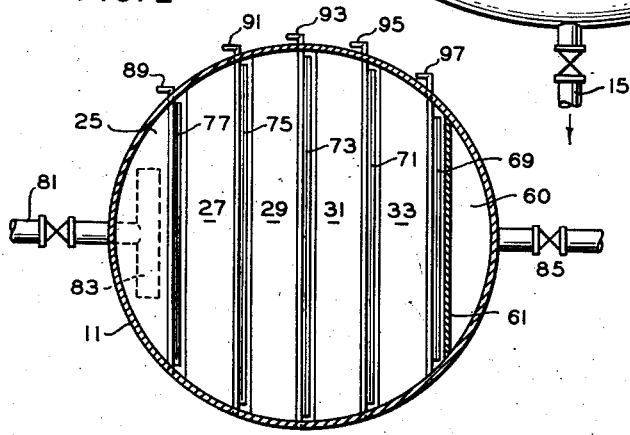
Figure 2 is a cross-sectional view taken on the line 2—2 of Figure 1.

The operation of each of the tray assemblies of this vessel is the same or substantially the same, the only difference being that the light liquid under tray assembly 21 flows across the column from left to right while the light liquid flows across the column under tray assembly 19 from right to left. The specifically light liquid to be treated in this column is introduced therein through a feed line 81 and is distributed in the riser space 34 by a distributor tube 83. This tube is also illustrated in Figure 2. In case liquid reflux is introduced into the lower portion of column 11 in an attempt to produce a higher quality bottoms product the material is introduced into the column through a reflux feed line 85 and is distributed by a reflux distributor tube 87. The heavy phase is withdrawn from the column through a line 15.

The several baffle members belonging to tray assembly 21 not specifically mentioned herein above are baffles 49, 51, 55 and 57 while the other semicircular baffles are baffles 47, 53 and 59. Baffle 61 serves not only to define the mixing space for liquid flowing between it and baffle 57 but it extends upward to define the riser space 60.

When such a liquid-liquid mixing column as herein described is constructed for commercial operation a fixed quantity of light liquid is usually contacted with a fixed quantity of heavy liquid per unit of time with a given ratio of heavy liquid to light liquid. The sloping baffles 69, 71, 73, 75 and 77 on, for example tray 21, are so disposed to give a fixed ratio of the heavy liquid flowing between these sloping baffles and the respective vertical baffles, 61, 55, 49, 44 and 39 and the inspirated light liquid. If, under certain conditions, it is desired to change the ratio of liquids being contacted it is necessary to shut down the column, remove manhole covers or the like, and readjust the position of the sloping baffles. Such an operation entails considerable time and expense. I find that these sloping baffles can be so constructed that they can be adjusted from outside of the column while it is in operation merely by hinging the sloping baffle members to the tray plate to which they are normally rigidly attached, and providing rods extending through the walls of the vessel with handles or other elements 89, 91, 93, 95 and 97 of Figure 2. Thus, by manual operation the ratio of heavy liquid to light liquid passing through the mixing units can be regulated. As mentioned above when the column is to be used under commercial conditions and the ratio of liquid fed to the column and the flow rates are more or less uniform and the hereinabove described adjustment means need not be provided but I find that for use in an experimental or pilot plant column such adjusting devices are very helpful.

The solvent liquid in extraction operations is ordinarily present in larger volume than the liquid being extracted and when it is specifically heavier it flows downward through the slots in the trays and furnishes the motive power for the mixing.

Referring to Figure 3 reference numeral 111 identifies a treating column of more or less conventional shape which is provided with contacting tray assemblies 103, 105, 107 and 109. The principal upon which the mixing apparatus of Figure 3 operates is actually the same as that upon which the apparatus of Figure 1 operates. The difference is merely in the shapes of the mixing units. In column 1 the individual mixing units were linear or straight and extended across the vessel from one wall to the other. The mixing units in Figure 3 are circular in form and are disposed in the vessel concentric with its longitudinal axis.

In the tray assembly 107 apparatus element 129 is an annular plate attached liquid-tight to the inner walls of the vessel. A second annular plate 131 is disposed as shown in the opening within plate 129 in such a manner that an annular space is left between these two rings. A centrally disposed tube 141 is positioned in the opening in the center of plate 131 as shown. This tube 141 is intended to serve as a riser for light liquid to flow from the point of outlet of light liquid in tray 107 to the next higher tray in the column. A cylindrical baffle member 133 is disposed in the column as shown and its diameter is the same as the inner diameter of the annular ring 129. This cylinder 133 is disposed in the column in such a manner that its top edge is positioned a short distance below the inner edge of the annular member 129. Attached to the inner edge of this annular member 129 is a baffle member 143 which in effect, is a frusto-conical member positioned inside along the inner edge of annular plate 129 as shown. Inside cylinder 133 is a cylinder 147 of somewhat smaller diameter. The diameter of this cylinder 147 is the same as the outer diameter of the annular member 131 and cylinder 147 is attached to the annular member 131 as shown. Cylindrical member 147 and member 133 provide an annular space therebetween which conducts heavy liquid from above the tray to a settling space under the tray. When this heavy liquid flows between the frusto-conical baffle 143 and the inner cylinder 147 an inspirating action results in the flow of light liquid from the space under plate 129 into the annular space between the two cylinders. Thus, when the light liquid enters this annular space by this inspirating action it is vigorously admixed with the downward flowing heavy liquid. When the mixture of liquids reaches the bottom of this annular space it is directed upward by the semi-circular baffle 135 and the liquids are partially separated by the centrifugal action on flowing around this baffle. Separation is completed in the settling space between cylinder 147 and a smaller diameter cylinder 137. This smaller diameter cylinder 137 also forms an outer wall for a second mixing unit. Heavy liquid from above the annular ring 131 flows downward between the inner cylinder 137 and the riser pipe 141 and inspirates light liquid and the mixture is partially separated on rounding the bend of element 139 by centrifugal action and upon entering a riser space 142 separation is completed, the heavier liquid flowing downward to a next lower tray and a lighter liquid rising upward to a next higher tray. Upon reaching the top of the column the lighter liquid is removed through an outlet 113 while the heavy liquid is removed from the bottom of the column from the outlet line 121. Solvent is introduced into the top of the column through pipe 115 and is distributed above the top of plate assembly 109 by a distributor ring 127. When liquid to be extracted is desired to be introduced into the column at a level about half-way up the column it is then introduced through a feed pipe 117 and distributed around the column in riser space 140 by a distributor pipe 125. In case it is desired to reflux the material removed from the bottom of the column reflux material is introduced through pipe 119 and is distributed around the column by a distributor ring 123.

I have found that by the use of liquid-liquid mixing equipment similar to that illustrated in Figure 1, I am able to carry out solvent extraction operations of a hydrocarbon with an extraction solvent in a very efficient manner. The apparatus and method of my invention can be used for contacting lubricating oil stocks with extraction solvents; for treating liquids containing for example, hydrogen sulfide, with aqueous solutions of sodium carbonate or caustic soda or amines or their solution, etc., for removal of the acid gas. In fact, my contacting apparatus can be used for contacting most any pair of immiscible or partially miscible liquids wherein their densities are sufficiently separated as to permit gentle centrifugal and gravity separation.

The apparatus illustrated in Figures 1 and 3 is of the type for contacting a specifically heavier liquid with a lighter liquid wherein the heavier liquid phase substantially fills the vessel or in other words the interface between the light liquid in the top of the vessel and the heavier liquid phase is maintained at a level above the top surface of the top tray assembly 109 in Figure 3 and above the top surface of the top tray assembly 19 of Figure 1. Such an operation is frequently used when treating, for example, a lubricating oil stock with an extraction solvent which is specifically heavier than the oil stock and wherein the rate of solvent feed is greater than the rate of hydrocarbon feed.

Under some conditions it is desirable to extract for example, an oil stock, with an extraction solvent which is specifically lighter than the oil stock and an apparatus for use under such conditions is illustrated in Figure 5. In this case the solvent is introduced into the bottom of the vessel while the oil stock to be extracted is introduced at a mid level or at the top. When it is desired to reflux an extract phase the feed hydrocarbons are introduced at a level about midway up the column and the reflux is introduced into the column at a level above the top tray. In this case the interface between the two phases is frequently maintained below the bottom trays.

In order to treat or extract a specifically heavy oil with a lighter solvent the actual contacting elements are installed above the surface of the tray and are inverted. On reference to Figure 5 this inverted positioning of the contacting elements is illustrated. The specifically light solvent flows upward, for example, through a slot 151 and on passing a baffle 153 draws heavier liquid from space 155 and the admixture of liquids flows upward and around the curve of a baffle 157 and is discharged into a settling space 159. Partial separation between the two phases is accomplished by a centrifugal action while the admixture is flowing around the surface of the curved baffle 157 and the separation is completed in the settling space 159. With the lighter solvent liquid rising upward from this space, the heavier liquid settles downward only to be drawn into the next liquid-liquid mixing unit. The mixing units illustrated in Figure 5 can be straight ones similar to those of Figure 1 or they may be circular ones as illustrated by those in Figure 3. The operation of the column using a specifically light solvent and a heavier liquid being treated is substantially the same as when using a heavier solvent and light liquid but as mentioned above the extract will be removed from the top of the column and the raffinate phase from the bottom.

Figure 4 is a cross sectional view taken along the line 4—4 of Figure 3 looking downward.

In solvent extraction operations one common practice is to use a considerably larger volume of solvent per unit of volume of oil being extracted. Volume ratios of solvent to oil vary between such wide limits as 2 to 1 to as high as 20 to 25 to 1 or even higher.

To illustrate the efficiency of the mixing device of my invention I submit the following examples.

*Example 1*

|  | Wt. Percent Cyclohexane | Wt. Percent n-Heptane | Solvent, Wt. Percent |
|---|---|---|---|
| Feed | 69.3 | 30.7 |  |
| Raffinate phase | 60 | 40 |  |
| Extract phase | 6.4 | 1.7 | 91.9 |
| Solv.-free ext. hydrocarbons | 79.3 | 20.7 | 0 |

Tray efficiency by Ponchon method of calculation=72.1%.

*Example 2*

|  | Wt. Percent Cyclohexane | Wt. Percent n-Heptane | Solvent, Wt. Percent |
|---|---|---|---|
| Feed | 69.3 | 30.7 |  |
| Raffinate phase | 58.5 | 41.5 |  |
| Extract phase | 6.2 | 1.8 | 92.0 |
| Solv.-free ext. hydrocarbons | 77.5 | 22.5 | 0 |

Tray efficiency by Ponchon method of calculation=69.9%.

*Example 3*

|  | Wt. Percent Cyclohexane | Wt. Percent n-Heptane | Solvent, Wt. Percent |
|---|---|---|---|
| Feed | 74.9 | 25.1 |  |
| Raffinate Phase | 65.6 | 34.4 |  |
| Extract Phase | 6.92 | 1.54 | 91.54 |
| Solv.-free ext. hydrocarbons | 82 | 18 |  |

Tray efficiency by Ponchon method of calculation=61.0%.

*Example 4*

|  | Wt. Percent Cyclohexane | Wt. Percent n-Heptane | Solvent, Wt. Percent |
|---|---|---|---|
| Feed | 74.8 | 25.2 |  |
| Raffinate phase | 63.3 | 36.7 |  |
| Extract phase | 7.04 | 1.46 | 91.5 |
| Solv.-free ext. hydrocarbons | 83 | 17 |  |

Tray efficiency by Ponchon method of calculation=68.8%.

*Example 5*

In still another run using a methyl carbitol-n-heptane-cyclohexane system with a 15 inch tray spacing, the tray efficiency was 62 per cent, the combined stream (solvent and hydrocarbon) flooding rate was 800 gallons per square foot per hour with the interface between the raffinate and solvent phases being maintained above the top tray.

In these examples results of runs are given in which a mixture of cyclo-hexane and n-heptane was treated with methyl carbitol containing five per cent by weight of water as an extract solvent. In Example 1 it is seen that the feed mixture contained 69.3 weight per cent cyclohexane and 25.1 weight per cent n-heptane. The composition of the raffinate phase indicates that the concentration of the cyclohexane was reduced from 69.3 to 60 weight per cent. The extract hydrocarbons free from solvent contained 79.3 weight per cent cyclohexane and only 20.7 weight per cent n-heptane. The extract phase however was obviously largely solvent but contained 6.4 weight per cent cyclo-hexane and 1.7 weight per cent n-heptane. In making this run the particular column used contained two trays each being provided with two individual liquid-liquid contacting units similar to those illustrated in Figure 1. The tray efficiency as calculated by the Ponchon method was 72.1 per cent. It will be noted that this tray efficiency is very high.

When the solvent liquid is specifically lighter than the liquid being treated, it flows upward through the tray slots and furnishes the motive power for the contacting.

In Examples 2, 3 and 4 similar mixtures of hydrocarbon feed were treated with the methyl carbitol-water as the solvent. The tray efficiencies of these latter examples as calculated by the Ponchon method were 69.9 per cent, 61.0 per cent and 68.8 per cent, respectively. In Example 5 still another run was made using a methyl carbitol-n-heptane-cyclohexane system with a 15 inch tray spacing to determine tray efficiencies and flooding rate. In this example the tray efficiency by the Ponchon calculation method was 62 per cent and the combined stream (solvent and hydrocarbon) flooding rate was 800 gallons per square foot per hour when the interface between raffinate and solvent phases was maintained above the top tray.

Materials of construction for use in manufacturing the liquid-liquid contacting apparatus of my invention can be selected from among those commercially available taking into account the corrosive nature of liquids being treated.

While certain embodiments of the invention have been described for illustrative purposes the invention obviously is not limited thereto.

I claim:
1. In a vertically disposed column for contacting two immiscible liquid phases of unlike specific gravities, a liquid-liquid contacting tray assembly comprising, in combination, a pair of horizontally disposed plate sections, said sections being arranged at a spaced distance from each other so as to form a first slot therebetween, a first baffle member along one edge of said first slot and extending in a direction on one side of said tray assembly parallel to the axis of said column, a second baffle member along the other edge of said first slot and leaning toward said first baffle member on said one side of said tray assembly, a third baffle member parallel to said first baffle member on said one side of said tray assembly and disposed along the other edge of said first slot and at a spaced distance therefrom forming a second slot intermediate said tray assembly and the adjacent edge of said third baffle, a curved baffle fixed to the edge of said third baffle farthest from said tray assembly and extending around but at a spaced distance from the adjacent edge of said first baffle, means to introduce the liquid of greater specific gravity to the slot open on the upper side of said tray assembly and means to introduce the other liquid to the slot open on the underside of said tray assembly.

2. The liquid-liquid contacting tray assembly of claim 1 wherein said baffles are disposed on the underside of said tray assembly.

3. The liquid-liquid contacting tray assembly of claim 2 wherein said slots are straight.

4. The liquid-liquid contacting tray assembly of claim 2 wherein the longitudinal axes of said slots are circular in shape.

5. The liquid-liquid contacting tray assembly of claim 1 where said second baffle is hinged to said tray along said other edge of said first slot and means attached to the hinged baffle and extending through the wall of said column to move the edge of said hinged baffle closer to and farther from said first baffle member.

6. The liquid-liquid contacting tray assembly of claim 1 wherein said baffles are disposed on the upper side of said tray assembly.

7. The liquid-liquid contacting tray assembly of claim 6 wherein said slots are straight.

8. The liquid-liquid contacting tray assembly of claim 6 wherein the longitudinal axes of said slots are circular in shape.

References Cited in the file of this patent

UNITED STATES PATENTS

| | | |
|---|---|---|
| 2,345,667 | Hachmuth | Apr. 4, 1944 |
| 2,398,345 | Cooper | Apr. 16, 1946 |
| 2,523,126 | Long | Sept. 19, 1950 |
| 2,665,975 | Ng | Jan. 12, 1954 |